(12) United States Patent
Roytman

(10) Patent No.: US 8,667,405 B2
(45) Date of Patent: Mar. 4, 2014

(54) BROWSER-BASED DEVELOPMENT TOOLS AND METHODS FOR DEVELOPING THE SAME

(75) Inventor: Alexander Roytman, Dayton, OH (US)

(73) Assignee: Profound Logic Software, Inc., Dayton, OH (US)

( * ) Notice: Subject to any disclaimer, the term of this patent is extended or adjusted under 35 U.S.C. 154(b) by 0 days.

(21) Appl. No.: 13/359,039

(22) Filed: Jan. 26, 2012

(65) Prior Publication Data

US 2012/0131550 A1 May 24, 2012

Related U.S. Application Data

(62) Division of application No. 12/185,373, filed on Aug. 4, 2008, now abandoned.

(60) Provisional application No. 60/953,705, filed on Aug. 3, 2007.

(51) Int. Cl.
*G06F 3/048* (2013.01)
*G06F 15/16* (2006.01)

(52) U.S. Cl.
USPC ........... 715/762; 715/733; 715/765; 715/760; 717/113; 709/203; 709/204; 707/705

(58) Field of Classification Search
USPC ......... 715/733, 738, 751, 753, 760, 761, 764, 715/765, 780, 781, 783, 784, 205, 234, 715/762; 707/705, 805; 709/201, 203, 204, 709/217–219
See application file for complete search history.

(56) References Cited

U.S. PATENT DOCUMENTS

| | | | |
|---|---|---|---|
| 6,204,846 B1 | 3/2001 | Little et al. | |
| 7,320,016 B2 * | 1/2008 | Walsh et al. | 709/200 |
| 7,331,018 B2 | 2/2008 | Lee et al. | |
| 7,484,096 B1 | 1/2009 | Garg et al. | |
| 2002/0065849 A1 * | 5/2002 | Ferguson et al. | 707/513 |
| 2004/0199543 A1 | 10/2004 | Braud et al. | |
| 2004/0226051 A1 * | 11/2004 | Carney et al. | 725/135 |
| 2005/0125735 A1 * | 6/2005 | Cohen et al. | 715/746 |
| 2007/0244849 A1 | 10/2007 | Predovic | |
| 2007/0300172 A1 * | 12/2007 | Runge et al. | 715/764 |
| 2008/0082604 A1 * | 4/2008 | Mansour et al. | 709/203 |

OTHER PUBLICATIONS

Paulson, Building Rich Web Applications with Ajax, Published by the IEEE Computer Society, Oct. 2005, pp. 14-17, USA.

* cited by examiner

*Primary Examiner* — Xiomar L Bautista
(74) *Attorney, Agent, or Firm* — Dinsmore & Shohl LLP

(57) ABSTRACT

A browser-based development tool is presented. The tool comprises an interactive user interface running in a browser resident on a client. The tool is programmed to enable a user to select a source of data from a server in communication with the client using the user interface and retrieve a limited data set from the selected data source. The data content of the limited data set is limited to that which is needed to populate a series of independent cells visible in a browser field. The tool is further programmed to display the retrieved data in the series of independent cells visible in the browser field and seamlessly scroll through the data displayed in the series of independent cells as requested by the user. Additionally, a browser-based application can be developed locally on the client using the tool, saved on the server and deployed to others through the server.

9 Claims, 16 Drawing Sheets

| Properties - D_8_6 | |
|---|---|
| − Identification | |
| id | D_8_6 |
| screen identifier | true |
| field type | output field |
| value | script: value |
| − Font and Text | |
| color | #003399 ... |
| font family | Arial |
| font size | 19px |
| font style | italic |
| font variant | small-caps |

Color
Defines the color of the text inside the given element.

Usage: Enter a color name or select a color.

Valid colors by name: aqua, black, blue, fuchsia, gray,

| Session A - [24 x 80] | | | | |
|---|---|---|---|---|
| File Edit View Communication Actions Window Help | | | | |

Patient History Master Update

PT045D
7487  Last Name: Doe  First: John  Ger: Jr
Address: 430 Emerald Drive  Address 2:
C/S/Z: Marysville  IN  47141  Phone: 812-555-5555
Soc Sec: 286657540  Sex: M  Marital: S  Race: C  Anth: C  Religion: C  DOB: 12/03/77
Height: 5 Ft 09 In  Weight: 175 lb  Insur: Y  Date  Last: 04/27/08
Family Ph  Name: William Harvey  License: MD963-1522
Email: john.doe@profoundlogic.com  Cell Phone: 812-555-4286
Alt Ph: 812-555-9675  Ext 1136

Emergency Contact Information
Name: Susan Doe  Rel to Pat: Mother
Address: 6638 Campbell Street  Address 2:
C/S/Z: Underwood  IN  47177  Phone #: 812-555-6204

Employer of Patient
Name: Profound Logic Software  Occupation: Developer
Address: 562 Congress Park Dr.  Address 2:
C/S/Z: Dayton  OH  45459  Phone #: 937-439-7925
Father: John Doe Sr.  Mother: Susan Doe
Spouse: N/A  Maiden Name: N/A
Allergies: tetracycline, penicillin, and sulfa drugs Cur Meds  N/A F1 = Help  F2 = Symp  F3 = Exit  F7 = History  F8 = Billing  F12 = Previous

BROWSER-BASED DEVELOPMENT TOOLS AND METHODS FOR DEVELOPING THE SAME

CROSS-REFERENCE TO RELATED APPLICATIONS

This application is a division of U.S. patent application Ser. No. 12/185,373 filed Aug. 4, 2008, which application claims the benefit of U.S. Provisional Application No. 60/953,705, filed Aug. 3, 2007.

BACKGROUND

The present disclosure generally relates to a database tool and/or an application development tool and, in particular, relates to a system and method for delivering a database tool and/or an application development tool with a rich, highly interactive interface running in a browser.

BRIEF SUMMARY

A client/server software model typically describes the relationship between two computer programs in which one program, the client, makes a service request from another program, the server, which fulfills the request. Although the client/server model can be used by programs within a single computer, it typically communicates over a computer network which, as illustrated in FIG. 1, comprises a plurality of client/server network connections. Using a computer network, the client/server model provides a convenient way to efficiently interconnect programs that are distributed across many different locations. Most Internet applications, such as email, web access and database access, are based on the client/server model. For example, a web browser is a typical client program at the user computer that may access information at any web server in the world.

Most computer systems and software applications today rely heavily on databases to store and access information. It can be typical for a database to contain a large number of records (in the millions or billions or more) and to be accessed by a large number of users (hundreds or thousands or more). The databases can be accessed through specialized custom-developed computer applications or through database management tools. These computer systems typically fall into two types of categories: browser-based software and desktop software.

One embodiment of a typical browser-based software system is illustrated in the application, development, and deployment network of FIG. 1. Its main advantage can be that there can be one point of deployment and maintenance. The software can be installed on one Web server and immediately deployed to hundreds or thousands of users. It can also be easily deployed to remote users. Its main drawback can be its limited ability to present highly interactive user interfaces. Browser-based software can be served via web pages, which can be built using markup and scripting languages, such as HTML, CSS, and JavaScript. While such languages can allow computer applications to present database information to end-users, these capabilities can be limited compared to desktop software. For example, to present a listing of database records in a grid or tabular format, the browser can provide a construct called <table>. However, the browser's <table> construct can provide no capabilities to allow users to interactively resize columns or drag columns from one position to another by using an input device such as a mouse, for example. Likewise, the browser's <table> construct cannot handle massive amounts of rows (e.g. hundreds of thousands or millions of records). Consequently, no browser-based database querying or editing tools exist today that allow for high interactivity, such as working with massive amounts of records in one scrollable view. Additionally, no browser-based application development tool exists with a highly interactive visual interface.

An alternative to browser-based software can be desktop software. A typical system is illustrated in FIG. 2. The main advantage of desktop software can be in its capability to deliver a rich highly interactive user interface. For this reason, software in the areas such as word processing, spreadsheets, application development, database administration, photo editing, or computer aided design can typically be delivered as desktop software. However, desktop software can have major drawbacks. First of all, it must be installed, maintained, upgraded, and troubleshooted separately for each end-user. This process may be costly. Secondly, it may not be easy to deploy desktop software to remote users.

In general, prior database tools and application development tools have been either highly interactive desktop software or browser-based software with a limited user interface.

Therefore, there is a need for computer users to manage massive amounts of data in one view within a browser interface.

There is additional need for developers or end-users to interactively manipulate the interface presented to them in a browser in order to develop computer applications that the user can export or publish for use in a browser.

The present disclosure presented here can provide an improved user interface for the manipulation of database information, such as, for example, querying, editing, managing, and analyzing the database information, as well as a new method for building database-driven or other types of browser applications, such as Web sites, intranets, or extranets. The user interface itself for one embodiment of this disclosure can be a browser interface that can be deployed immediately to many users, such as programmers, database administrators, or business users.

The interface can enable users to manage massive amounts of data in one browser view, with capabilities to search, sort, graph, and edit data. In addition, the interface can allow users to design browser applications or browser application components, such as data listings and data forms. Currently, no other software or tools exist that allow computer users to manage massive amounts of data in one view within a browser interface. Furthermore, no other tools exist that allow developers or end-users to interactively manipulate the interface presented to them in a browser, and then export or publish it for use in a browser application.

In accordance with one embodiment, a browser-based development tool is presented. The tool comprises an interactive user interface running in a browser resident on a client. The tool is programmed to enable a user to select a source of data from a server in communication with the client using the user interface and retrieve a limited data set from the selected data source. The data content of the limited data set is limited to that which is needed to populate a series of independent cells visible in a browser field. The tool is further programmed to display the retrieved data in the series of independent cells visible in the browser field and to allow for seamlessly scrolling through the data displayed in the series of independent cells as requested by the user.

In accordance with another embodiment, a method for developing a browser-based application using a browser-based development tool comprises enabling a user to select and retrieve the browser-based application for development from a server using an interactive user interface running in a browser resident on a client. The retrieved browser-based application is displayed in a browser field. The browser-based application is developed locally on the client using the browser-based development tool. The developed browser-based application is saved on the server. The developed browser-based application is deployed to others through the server.

In accordance with one embodiment, computer users can manage massive amounts of data in one browser view within a browser interface.

In accordance with another embodiment, developers or end-users can interactively manipulate the interface presented to them in a browser, and then export or publish it for use in a browser application.

Accordingly, it is a feature of the embodiments to provide an improved user interface for querying, editing, managing, and analyzing database information.

It is another feature of the embodiments to provide a new method for building database-driven or other types of browser applications, such as Web sites, intranets, or extranets. Other features of the embodiments will be apparent in light of the description of the disclosure embodied herein.

BRIEF DESCRIPTION OF THE SEVERAL VIEWS OF THE DRAWINGS

The following detailed description of specific embodiments can be best understood when read in conjunction with the following drawings, where like structure is indicated with like reference numerals and in which:

FIG. 9 is a screenshot of a properties window for the WYSIWYG designer tool according to an embodiment.

FIG. 13 is a screenshot of a typical graphic button available in the WYSIWYG designer tool according to an embodiment.

FIG. 14 is a screenshot of a tab panel element for the WYSIWYG designer tool according to an embodiment.

FIGS. 15A-C are screenshots of modernizing legacy software using the WYSIWYG designer tool according to an embodiment.

DETAILED DESCRIPTION

In the following detailed description of the embodiments, reference is made to the accompanying drawings that form a part hereof, and in which are shown by way of illustration, and not by way of limitation, specific embodiments in which the disclosure may be practiced. It is to be understood that other embodiments may be utilized and that logical, mechanical and electrical changes may be made without departing from the spirit and scope of the present disclosure.

The present disclosure presents a system for delivering a database tool and/or an application tool with a rich, highly interactive user interface running in a browser. A browser can be any client software program that can be used to search networks, retrieve copies of files and display them in an easy-to-read, often graphical, format. The interactive user interface of the tool can be built with client-side browser languages such as, for example, HTML (Hypertext Markup Language), CSS (Cascading Style Sheets), and JavaScript. Client-side can refer to operations that are performed by the client in a client-server relationship. With this setup, no client installation can be necessary and the software may be deployed to many users immediately. The users can use any commercially available browser already preinstalled on their computer.

The tool interface can make HTTP requests to a server-side language such as, for example, RPG, Java, or PHP. Server-side can refer to any operation or action that is performed by a server as opposed to the client. The server-side language can be used as a means of retrieving or updating database information that resides on the server. It can fetch data, or perform other operations as necessary. The HTTP requests can be made using AJAX (Asynchronous JavaScript and XML) or any another method known in the art. Preferably, the information can be exchanged in a standard format such as XML or JSON.

Figure 3:
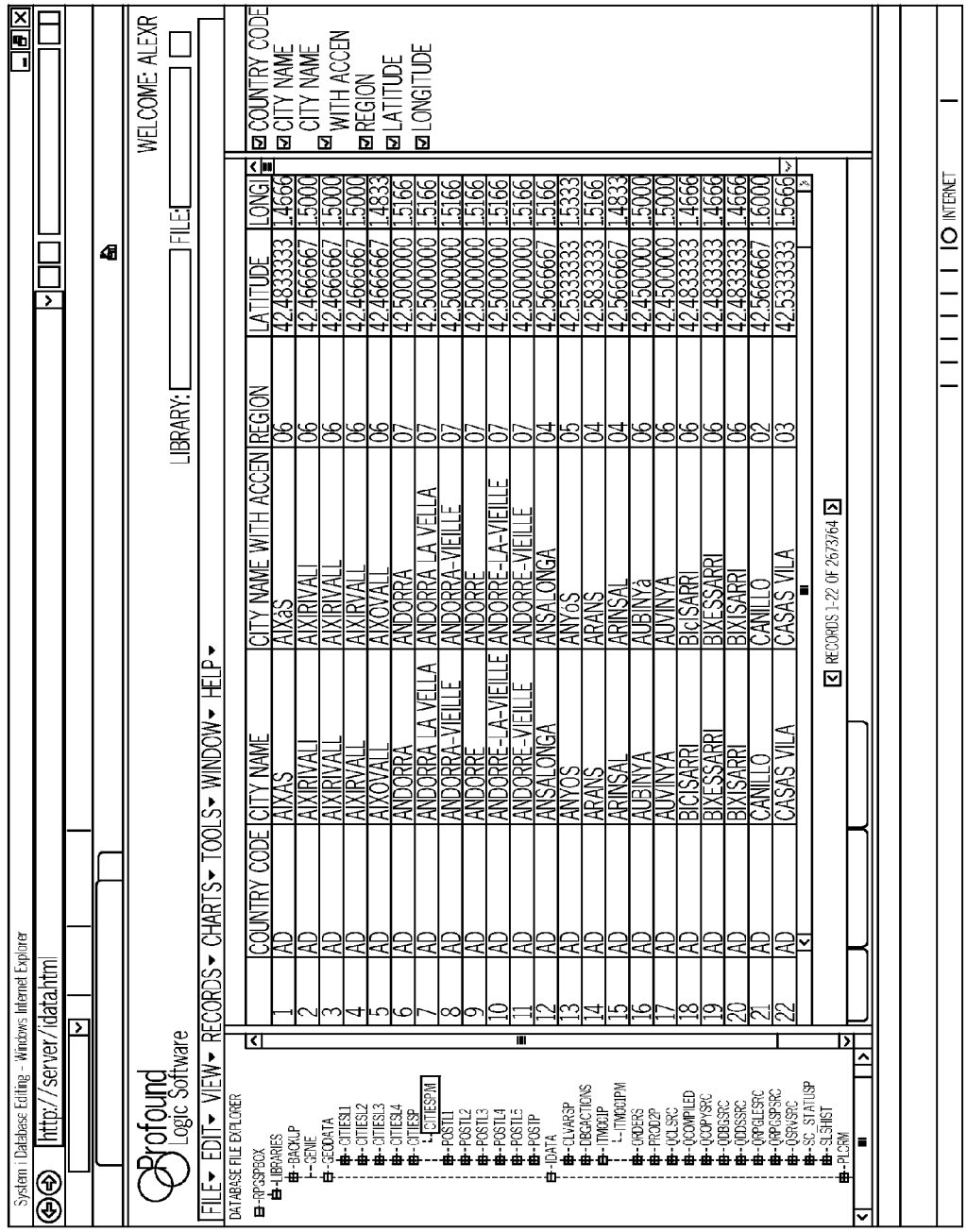
FIG. 3 is a screenshot demonstrating a tree of database tables, tabs for managing multiple open tables, a grid view of database table data, and a selection of database fields according to an embodiment.

In one embodiment, a source of data, such as, for example, a database table, which can also be known as known as a database file, can be selected by the user. Preferably, the user can have the option to key in the table name, or select it from a tree of database servers, schemas/libraries, and tables as illustrated in FIG. 3 (left side). Alternatively, the user may specify an SQL statement for fetching the data. In another embodiment, the source of the data selected by the user can be a website pre-loaded with data from a database table The information about the database table and the data that belongs to it can be retrieved through one or more HTTP requests. The data can be then displayed in browser field. Although the browser field will typically occupy the visible field of view of the browser, it is contemplated that the browser field can be larger or smaller than the field of view of the browser. To optimize the performance of the development tool, the content of the browser field can represent a "user centric" set of data fields, i.e., a set of data fields having a size that reflects the ability of the user to process data. User-centric sets of data fields would not exceed the workable comprehension of a user and would not be smaller than that which would be deemed useful by a user.

Multiple database tables may be selected simultaneously by the user. Additionally, the multiple database tables may be closed independently of each other. The multiple database tables can be represented by tabs in the browser.

In one embodiment, one available browser field view can be a grid or table view as shown in FIG. 3. In order to create a rich and highly interactive user interface, the grid typically is not built with standard HTML constructs (such as, for example, <table>, <tr>, and <td> tags) for building grid or table views. Instead, a series of independent cells are clustered together, preferably represented by <div> and/or <span> tags, and styled by CSS (Cascading Style Sheets). While a true HTML table with rows and columns does not exist, the concept of a table can be created programmatically. Individual cells can be built and organized into rows and columns using a client-side scripting language, such as, for example, JavaScript. Using a client-side scripting language, the cells may be built and managed dynamically—a concept known as DHTML, or Dynamic HTML. Using DHTML, these cells, as well as any related content, may be accessed and updated through the browser's DOM (Document Object Model), a standard object model for representing HTML. Unlike an HTML table, each cell in this type of table can be created, styled, and positioned separately.

With this dynamic arrangement of independent cells representing columns and rows, the columns and rows can be moved, resized, highlighted, or otherwise modified or manipulated based on user events. The user may manipulate the independent cells using an input device such as, for example, a mouse, keyboard, stylus, or any other suitable input device known in the art. For example, using a client-side scripting language, mouse events can be detected to determine if the user is dragging the border of a header cell for a column. The selected column can then be resized through the DOM by adjusting the width of each cell in the column, and moving all cells in columns that follow the selected columns to the left or right. Similarly, the user may move specific columns or rows. Additionally, rows and/or columns may be removed/added, sorted, filtered, or locked. To add or remove a database column (i.e. database field) from view, the user may drag it on or off the interface, or checkmark the field name or description on a list of fields as demonstrated in FIG. 3 (right side). Furthermore, data populating the individual cells can be edited by the user. New cell data can be sent to the server using a method such as AJAX and processed by a server-side language, which will in turn update the database.

Since all columns and rows of a database table may not fit onto the user's browser field, only a limited data set of the data source can be viewed in the browser field. The system can accommodate for scrolling through the data. For small amounts of data, the browser can provide built-in scrolling capabilities though CSS attributes, such as "overflow:auto". This may be appropriate for scrolling horizontally, since the number of columns in one database table can be relatively small. However, using built-in browser scrolling to scroll through large amounts of data (e.g. millions of database records or more) may not appropriate due to bandwidth and memory limitations.

To enable scrolling through massive amounts of data records, a separate scroller can be established. One implementation of such a scroller can be accomplished by creating an outer and an inner dummy block or division, preferably represented by HTML <div> tags. The outer block can be styled with "overflow:auto". The height of the outer block (in pixels) can be calculated by multiplying the number of rows per page by the row height in pixels, making the scrollbar the same height as the grid itself. The height of the inner block can be calculated as follows:

height of inner block (in pixels)=(records in database table−number of rows per page)*multiplier+ height (in pixels) of outer block;

where the multiplier can be a value that most closely matches the number of pixels content will scroll when the user clicks a scroll arrow on a scrollbar. The multiplier value may not be the same in all browsers. This arrangement allows the inner block to become scrollable content within the outer block. The distance between the top of the outer block and the topmost portion of the inner block content currently visible can be used to calculate which database records are currently in view. In most browsers, this distance can be reported by the scrollTop property in JavaScript. The formula to calculate the first database record in view can be scrollTop divided by the multiplier.

With a separate scroller in place, it may not be necessary to populate the individual cell with all database records at once. The interactive user interface can be used to populate a limited data set by loading only the records visible to the user in the browser field at any given time. The scroller can report which records are currently in view. As the scroller is scrolled, HTTP requests can be sent to the server using AJAX or some other method to retrieve the appropriate records. Thereby, the records will be selectively updated and repopulated in the browser field as requested by the user using the scroller. To the user, the records can appear as if the scroller was seamlessly scrolling through all the records. By seamlessly scrolling, the records can appear to the user in the browser field with no awkward transitions, interruptions, or indications of disparity due to the uploading and repopulation of the records. The HTTP requests can be processed with a server-side language, which uses SQL or record-level database access to return the requested set of records in a format such as XML. Preferably, the database can be an indexed relational database and the server-side language can return, update and repopulate any given page of records with sub second response time.

To avoid excessive requests to the server, the interactive user interface can attempt to determine whether the user has finished scrolling or is still scrolling and only send HTTP requests when scrolling is complete. This can be determined by detecting some period of inactivity, such as ¼ of a second, between browser scroll events.

To further improve performance, a system can be established where processing of existing HTTP requests can be aborted, when new requests supersede existing requests.

To further decrease the number of requests to the server, previously viewed records can be cached in a JavaScript array or a similar structure. When users scroll to an area that contains records they already viewed, the records can be retrieved from cache rather than making additional HTTP requests.

Figure 4:
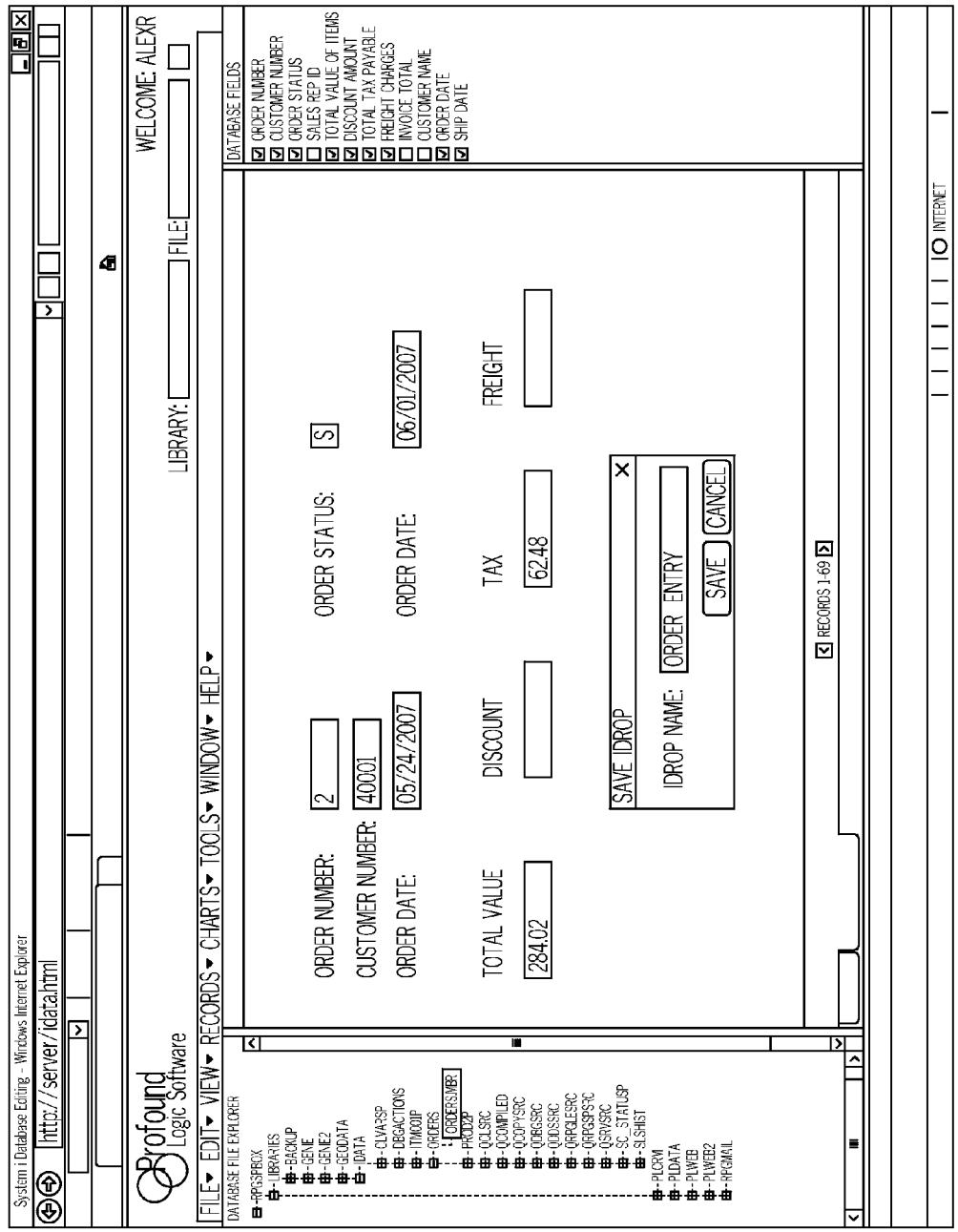
FIG. 4 is a screenshot of a browser-based form designer, where elements can be changed, moved, and resized according to an embodiment.
Figure 5:
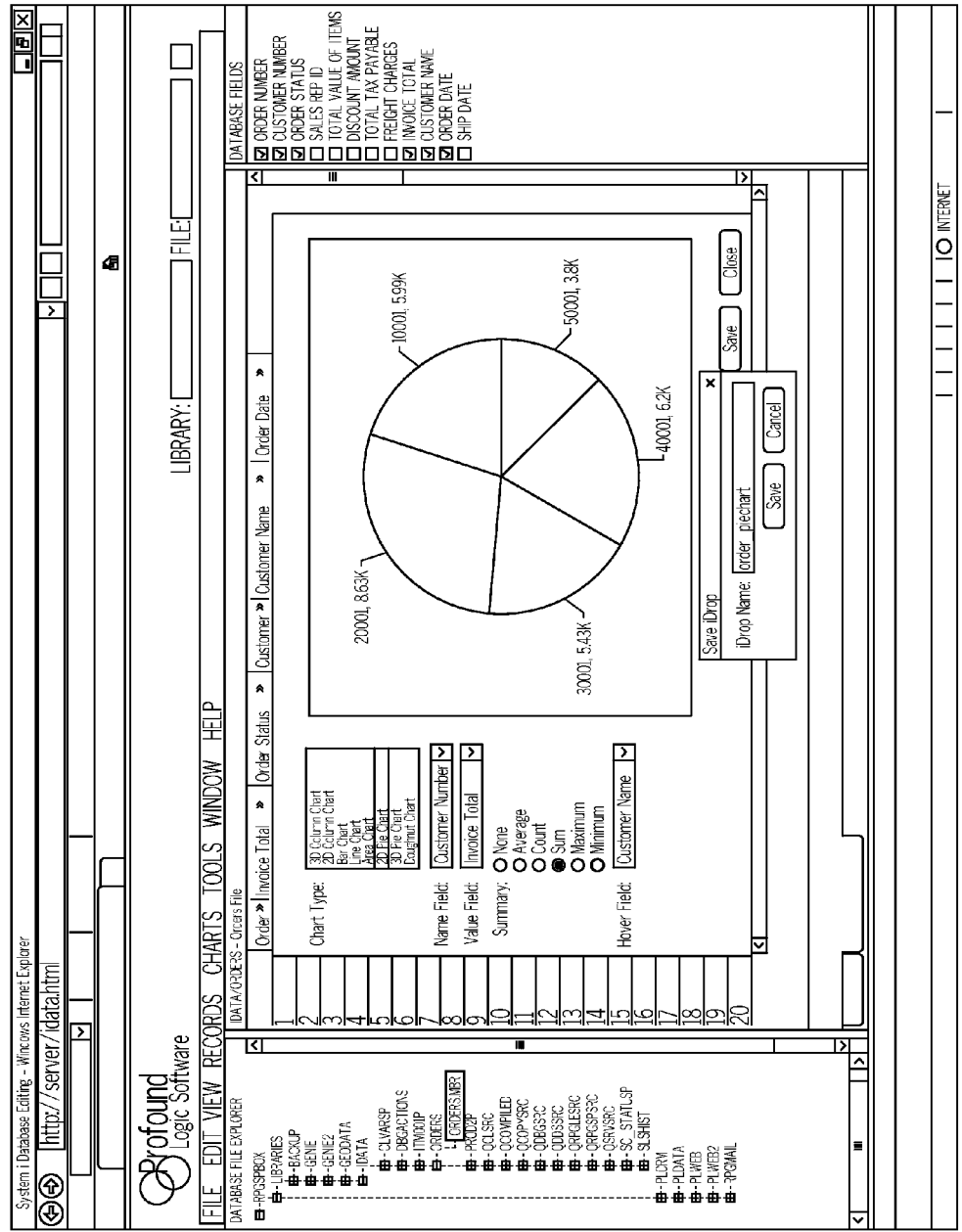
FIG. 5 is a screenshot of a browser-based pie chart builder according to an embodiment.

As described above, the system where users can resize, move, or otherwise adjust their own browser interface (in the above case—a listing of database records in a grid) can also be applied to the area of application development. Users or developers can use the browser itself to design the interface and the functionality of a browser application in a WYSIWYG (What You See Is What You Get) manner. Using a development environment built with HTML, and related technologies (i.e. CSS and JavaScript) to build applications based on the same technologies can have inherent advantages. Unlike browser application development tools that use a desktop IDE (Integrated Development Environment), developers can use a browser-based IDE, which is also referred to herein as a browser-based development tool. The designs created in a browser-based development environment can look identical or almost identical to the look of the end-result browser application. It can also be easier to test, debug and deploy the applications created in a browser-based IDE. The designs can be saved by sending HTTP request(s) to the server or some other method. Preferably, the format used to save the designs can be a widely-accepted format, such as HTML, XML, and/or JSON. This browser-based application development tool concept cannot be limited to grids or listings of records. It can also be applied to data entry forms (as shown in FIG. 4), single record inquiry screens, dynamic charts or graphs (as shown in FIG. 5), and any other types of screens or applications that can be designed in a browser.

Figure 1:
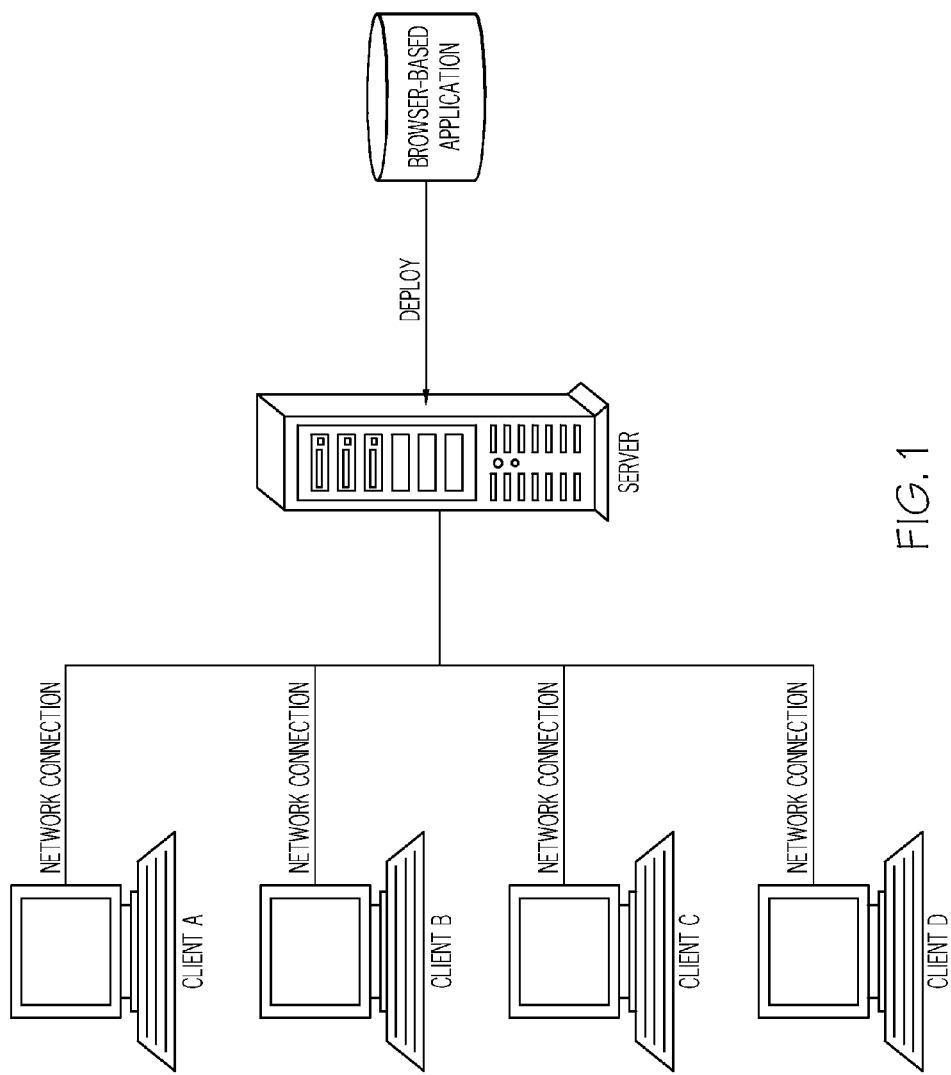
FIG. 1 is a diagram of browser based application deployment.
Figure 2:
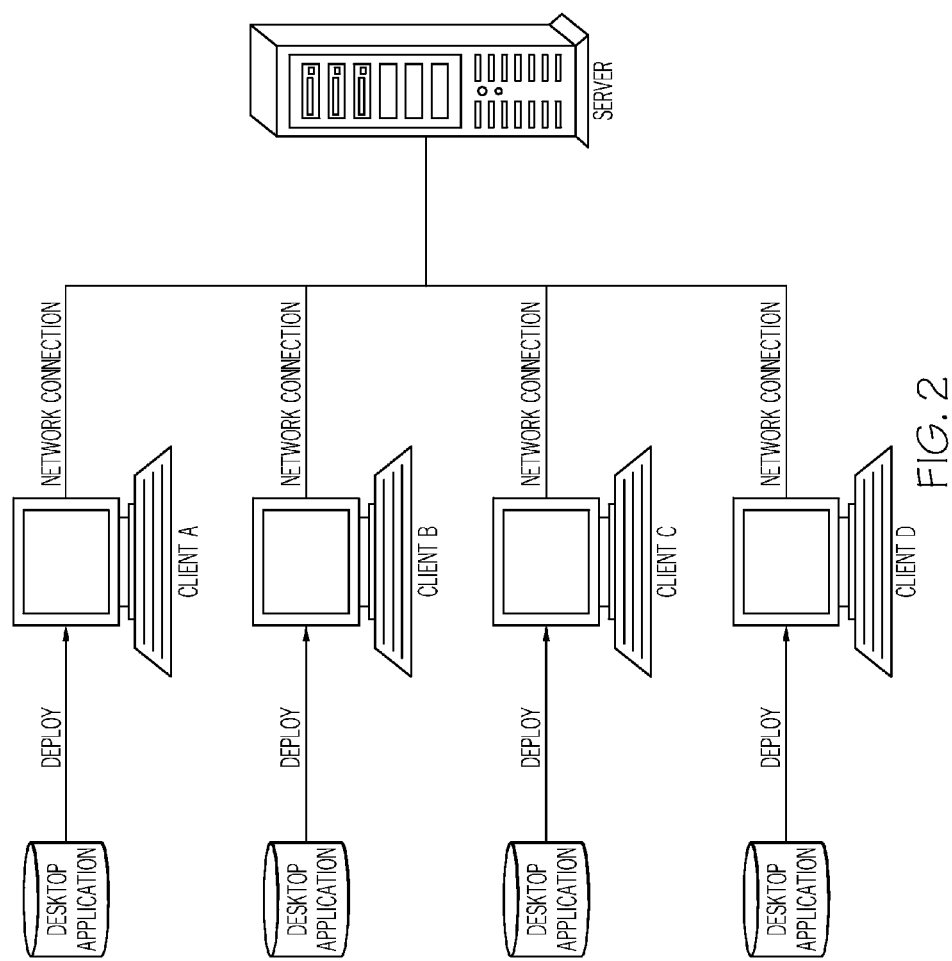
FIG. 2 is a diagram of desktop application deployment.
Figure 6:
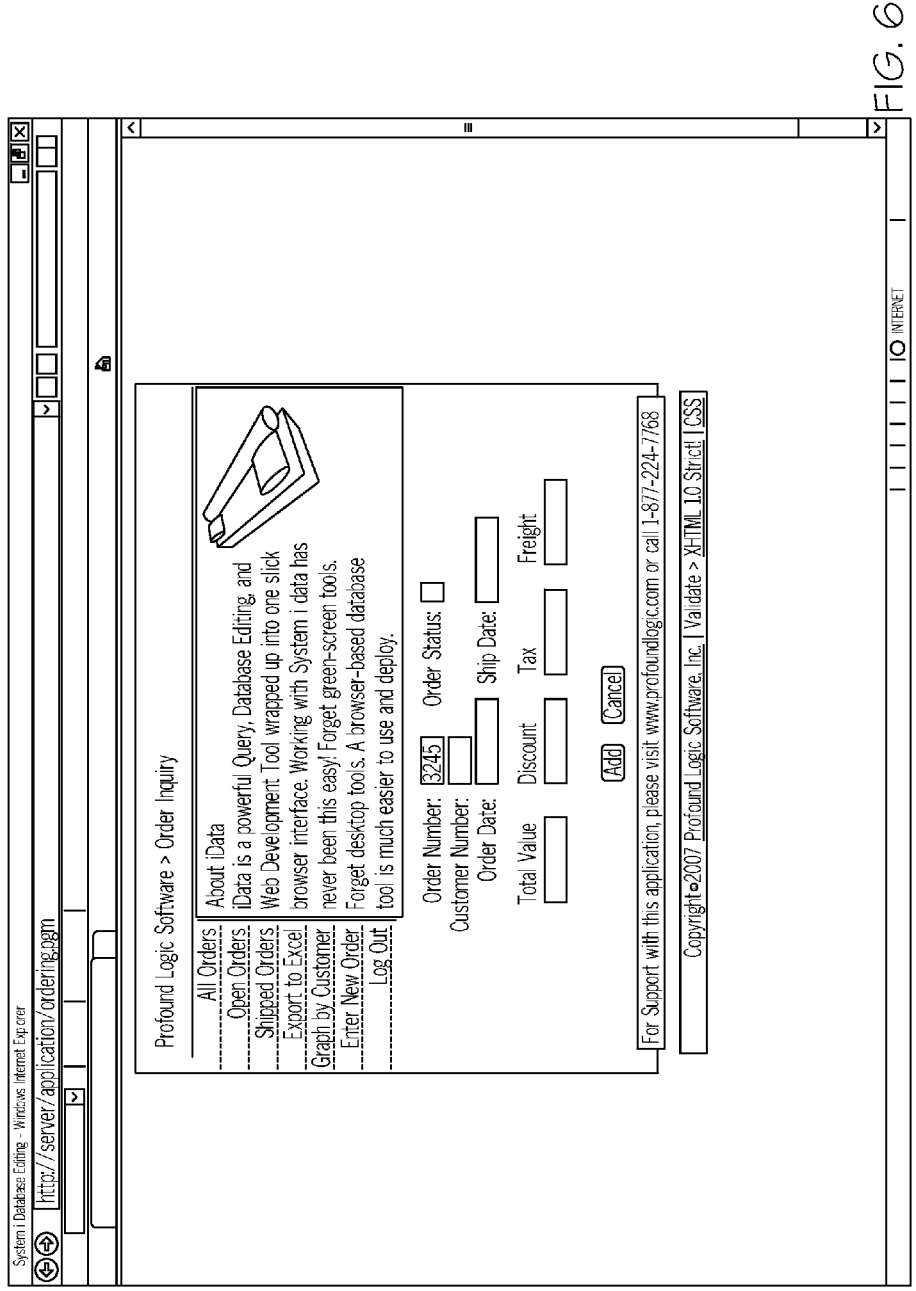
FIG. 6 is a screenshot of the data entry form built in 4 deployed to end-users according to an embodiment.
Figure 7:
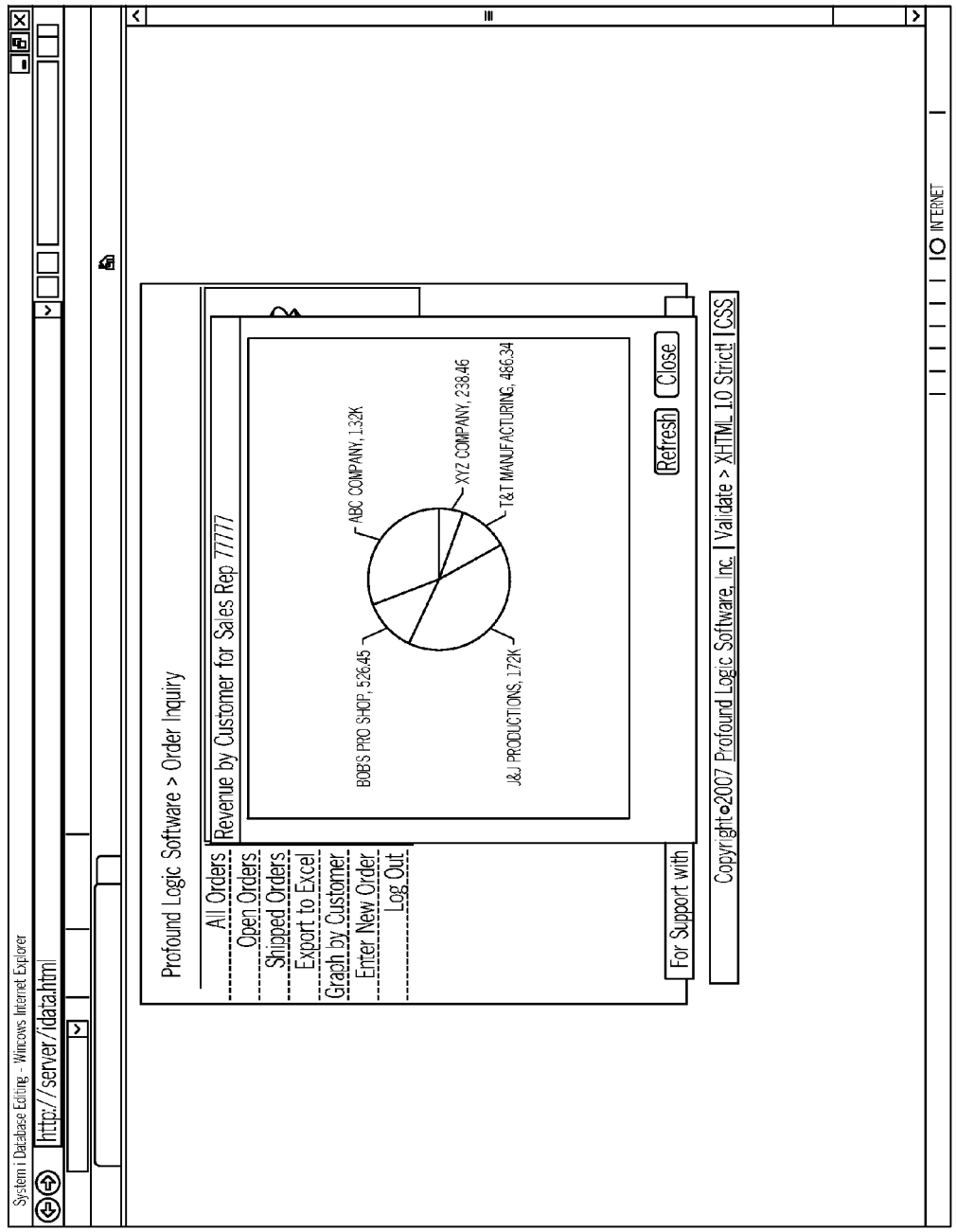
FIG. 7 is a screenshot of the pie chart built in 5 deployed to end-users according to an embodiment.

The application designs, which can be saved from the browser-based development tool environment, can be given a name. The designs can later be incorporated into a browser application by referring to that name in HTML or JavaScript code. The end-result can be a functioning browser application that can be deployed to end-users. As is clearly illustrated in FIG. 1, a client's browser-based application is deployed to a server via a client/server network connection and end users in an application, development, and deployment network (see additional clients A, B, C, D) are connected to the server through a plurality of additional client/server network connections. For example, FIG. 6 illustrates the end result for the data entry form of FIG. 4, and FIG. 7 illustrates the end result for FIG. 5.

Figure 8:
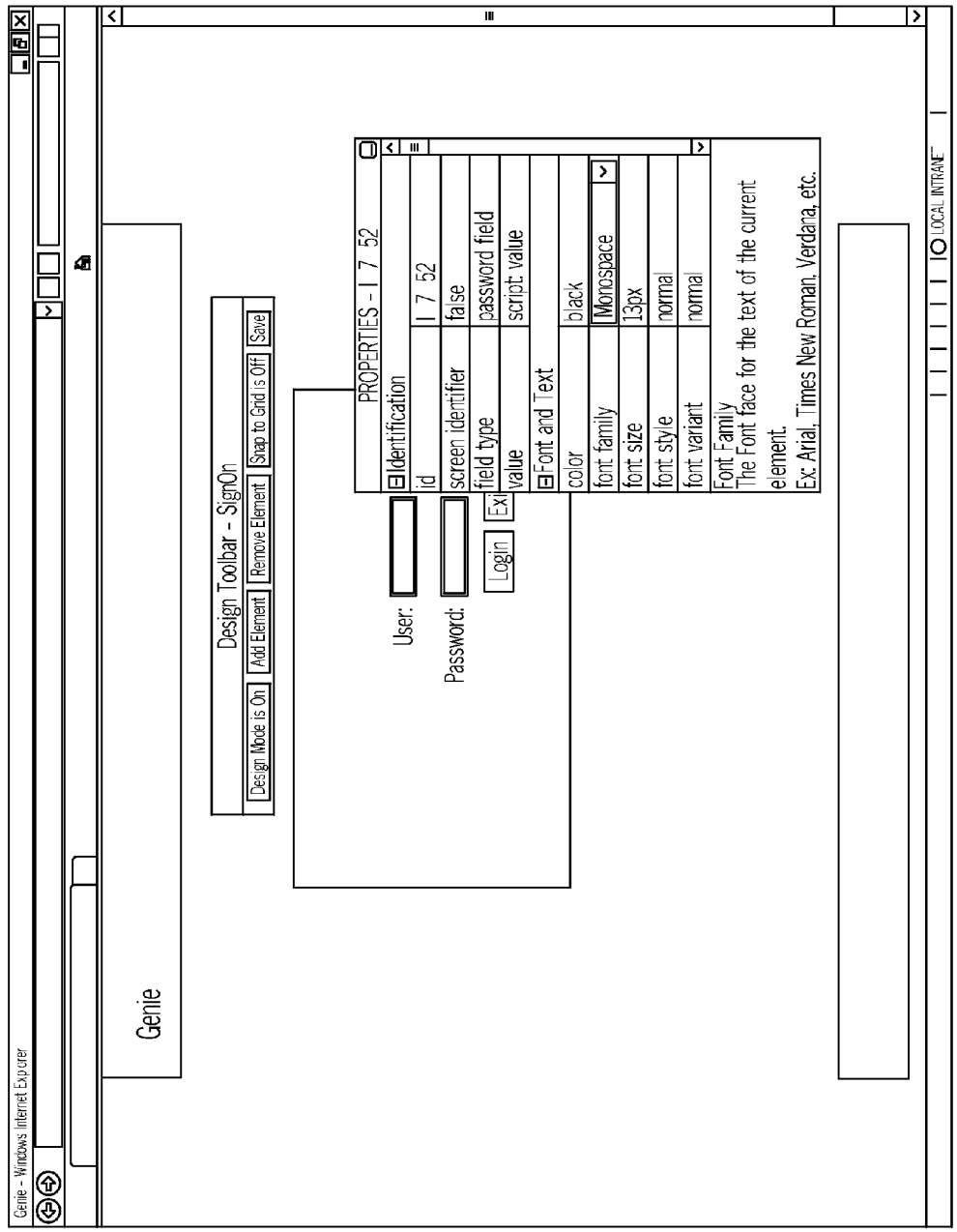
FIG. 8 is a screenshot of the WYSIWYG designer tool according to an embodiment.

The WYSIWYG browser-based development tool may have panels floating over the screens that are being designed, such as the Design Toolbar and Properties Window as illustrated in FIG. 8. The panels can be created on-the-fly using libraries of browser scripts, implemented in a language such as JavaScript. The scripts can create the panels by manipulating or adding to the DOM (Document Object Model) of the current page in the browser. Preferably the panels can be moved, sized, or collapsed by the application developer as needed.

A design toolbar can allow the developer to enable or disable design mode, add or remove elements from the page, enable snap-to-grid, save screen design, and/or perform other functions.

When design mode is enabled, elements on the screen can be selected, moved, sized, and/or modified by detecting the mouse and keyboard events (such as onmousedown, onmousemove, onmouseup, onkeydown, onkeypress, and onkeyup) and modifying the DOM of the page accordingly. The elements on the screen may be built with simple HTML constructs, such as textboxes represented by an INPUT tag or a dropdown represented by a SELECT tag, or they may be rich browser components such as Tab Panels or Charts constructed by a script library.

To begin operating on an element or a group of elements, the developer may click on an element, or alternatively, the developer can select more than one element by dragging the mouse over them. The selected elements would either be highlighted, outlined, marked with selector squares, or otherwise identified as selected. This can typically be accomplished by modifying the DOM using a function in a script library. For example, a selector square can be a DIV construct added to the DOM using JavaScript createElement() and appendChild() methods.

Once selected, the developer may proceed to modify many attributes that pertain to the selected elements using an interface such as the Properties Window illustrated in FIG. 9. The properties can represent all or some of the element's HTML attributes, CSS properties, JavaScript event properties, AJAX properties, database assignment properties, properties for rich browser components, and/or similar properties.

Preferably all, or at least some, but not limited to the following attributes/properties can be included:

Id: Set the ID of the current element.

Screen Identifier: If set to true, this element can be used to detect the screen. The ideal identifier element can be a static output field that can be unique to this screen.

Field Type: Determine the type of control that can be used to render the element.

Value: Set the initialization value for the current element.

Color: Define the color of the text inside the given element. This can be set by entering the color name, selecting a color, or specifying the hex value of the color.

Font Family: Defines the font face for the text in the current element.

Font Size: Defines the size of the text in the current element.

Font Style: Defines the style of the font used in the current element.

Font Variant: Defines the current element's font variant type.

Font Weight: Defines the font weight of the text in the current element.

Letter Spacing: Defines the amount of spacing between each letter of a word.

Text Align: Defines the alignment of the text in the current element.

Text Decoration: Defines the decoration on the text in the current element.

Text Transform: Transforms the default formatting of the text.

Word Spacing: Defines the amount of spacing between each word in the current element. Negative decreases spacing, positive increases spacing.

Ajax Url: Specifies the content url for an ajax field.

Checked Value: If the currently selected element is a checkbox field, this property specifies the value to send to the application when the box is checked.

Date Format: Defines the date format to use in a date field type element.

Disabled: Determines whether the element is disabled or not. The user cannot use a disabled field in any way. A disabled field is not submitted to the server application.

Html: Used to define custom html in an html field.

Image Source: Specifies the path to an image for an image field or a graphic button field.

Read Only: Defines whether the current field is read only or not. A read only field prevents the user from changing the value in the field; however, the user can still interact with the field.

Related Field: This property allows you to create a radio button group by associating multiple radio buttons with a field from the original application.

Select Box Height: Specifies the height of a select box. If defined, the select box appears as a listbox; if omitted, the select box appears as a dropdown.

Choices: Specifies the options for a select box.

Choice Values: Specifies alternate option values to send to the application for a select box.

Choices Database File: Specifies the database file to be used for a dynamic database-driven select box.

Choice Options Field: Specifies the database field name used to retrieve the options for a dynamic select box.

Choice Values Field: Specifies the database field name used to retrieve the values sent back to the application. If omitted, the choice options field is used.

Choices Selection Criteria: Optional expression identifying which records should be retrieved from the choices database file.

Order By: Optional expression identifying which fields determine the order of the choices in the select box.

Chart Type: Identifies the type of chart to display.

Database File: Specifies the database file to use for the chart's data source.

Name Field: Specifies the database field that determines the names by which records would be represented in the chart.

Value Field: Specifies the database field that determines the numerical values from which the chart is to be built.

Summary Option: Determines how values are used when creating the cart.

Record Limit: Sets a limit on how many records are to be used in the chart.

Chart Url: Sets the url to a web service that returns the chart definition and data in XML format. The service can be provided with any commercially available web development framework.

Chart Overlay: When set to true, the Chart panel will overlay any other content on the screen, regardless of z-index settings. When set to false, the Chart panel will behave according to normal layering rules, based on z-index.

Background Color: Defines the background color of the given element by entering a color name, selecting a color, or specifying a color using its hex value.

Background Image: Defines the background image of the current element.

Background Position: Specifies the position of the background within the current element.

Background Repeat: Defines how to repeat the background.

Left: Represents the x-coordinate of the current element. Typically measured in pixels (50 px), but can also be specified in percentages (20%), points (100 pt), or relative measurement units (10 em).

Top: Represents the x-coordinate of the current element. Typically measured in pixels (50 px), but can also be specified in percentages (20%), points (100 pt), or relative measurement units (10 em).

Height: Defines the height of the current element. Typically measured in pixels (50 px), but can also be specified in percentages (20%), points (100 pt), or relative measurement units (10 em).

Width: Defines the width of the current element. Typically measured in pixels (50 px), but can also be specified in percentages (20%), points (100 pt), or relative measurement units (10 em).

Z Index: Identifies the stacking order of the current element, expressed as an integer value. The element with the higher z index will overlay lesser elements.

Tab Names: This property identifies a comma separated list of tab names for a Tab Panel. The property is only applicable to elements with the field type "tab panel".

Active Tab: This property specifies the initial active tab on a Tab Panel. The default value for the active tab index is 0.

Ontabclick: Initiates a client-side script when a tab is clicked. The tab index is passed to the event as a parameter named "tab". This property is only applicable to elements with the field type "tab panel".

Tab Keys: This property identifies a comma separated list of function keys assigned to each tab within a Tab Panel. The function keys in the list are automatically pressed when the appropriate tab is selected, allowing users to navigate the original application through a tab interface.

Parent Tab Panel: This property specifies the id of the Tab Panel to which this element belongs. The property is set automatically when you drag and drop the element onto a Tab Panel.

Parent Tab: This property specifies the tab index of the specific tab to which this element belongs. Each tab within a Tab Panel is identified by a sequential index, starting with 0 for the first tab, 1 for the second tab, and so on. The property is set automatically when you drag and drop the element onto a Tab Panel.

Parent Field Set: This property specifies the if of the Field Set Panel to which this element belongs. The property is set automatically when you drag and drop the element onto a Field Set Panel.

Border Bottom Color: Defines the color of the element's bottom side of the border. This can be specified by entering the color name, selecting a color, or entering a hex value of the color.

Border Bottom Style: Defines the style of the element's bottom side of the border.

Border Bottom Width: Defines the thickness of the element's bottom side of the border.

Border Left Color: Defines the color of the element's left side of the border. This can be specified by entering the color name, selecting a color, or entering a hex value of the color.

Border Left Style: Defines the style of the element's left side of the border.

Border Left Width: Defines the thickness of the element's left side of the border.

Border Right Color: Defines the color of the element's right bottom side of the border. This can be specified by entering the color name, selecting a color, or entering a hex value of the color.

Border Right Style: Defines the style of the element's right side of the border.

Border Right Width: Defines the thickness of the element's right side of the border.

Border Top Color: Defines the color of the element's top side of the border. This can be specified by entering the color name, selecting a color, or entering a hex value of the color.

Border Top Style: Defines the style of the element's top side of the border.

Border Top Width: Defines the thickness of the element's top side of the border.

Padding Bottom: Sets the distance between the bottom edge of the current element and the element's content. Typically measured in pixels (50 px), but can also be specified in percentages (20%), points (100 pt), or relative measurement units (10 em).

Padding Left: Sets the distance between the left edge of the current element and the element's content. Typically measured in pixels (50 px), but can also be specified in percentages (20%), points (100 pt), or relative measurement units (10 em).

Padding Right: Sets the distance between the right edge of the current element and the element's content. Typically measured in pixels (50 px), but can also be specified in percentages (20%), points (100 pt), or relative measurement units (10 em).

Padding Top: Sets the distance between the top edge of the current element and the element's content. Typically measured in pixels (50 px), but can also be specified in percentages (20%), points (100 pt), or relative measurement units (10 em).

Css Class: Defines a custom cascading style sheet class to assign to the element. The class can be described in a css file.

Cursor: Determines how the mouse cursor should look when hovering over the element.

Overflow X: Determines whether a horizontal scrollbar should be displayed for this element.

Overflow Y: Determines whether a vertical scrollbar should be displayed for this element.

Tab Index: Determines the tab order for input elements on the screen. This property does not take effect unless the Prevent Auto Tab property is set to true.

Visibility: Determines whether the element is visible or hidden. Hidden elements appear dimmed out in design mode, and invisible at runtime.

Onblur: Initiates a client-side script when the element loses focus.

Onchange: Initiates a client-side script when the element value is changed. Typically used on select boxes to kick off an event when a different option is selected.

Onclick: Initiates a client-side script when the element is clicked.

Ondblclick: Initiates a client-side script when the element is double-clicked.

Onfocus: Initiates a client-side script when the element receives focus.

Onkeydown: Initiates a client-side script when a keyboard key is being pressed down on the element.

Onkeypress: Initiates a client-side script when the user presses and releases a keyboard key on the element.

Onkeyup: Initiates a client-side script when the user releases a keyboard key on the element.

Onmousedown: Initiates a client-side script when the mouse is pressed down on the element.

Onmousemove: Initiates a client-side script when the mouse is moving within the element.

Onmouseout: Initiates a client-side script when the mouse is moved off the element.

Onmouseover: Initiates a client-side script when the mouse is moved over the element.

Onmouseup: Initiates a client-side script when the mouse button is released off the element.

Once a property is changed, the visual changes (such as changes to colors, fonts, borders, sizes, etc.) can be reflected immediately in design mode. Preferably, this can be done by modifying the DOM of the current page. In addition, the new property value can be retained in a construct such as a JavaScript object. This object, or other similar construct, can be later queried when the user decides to save the screen definition.

Figure 10B:
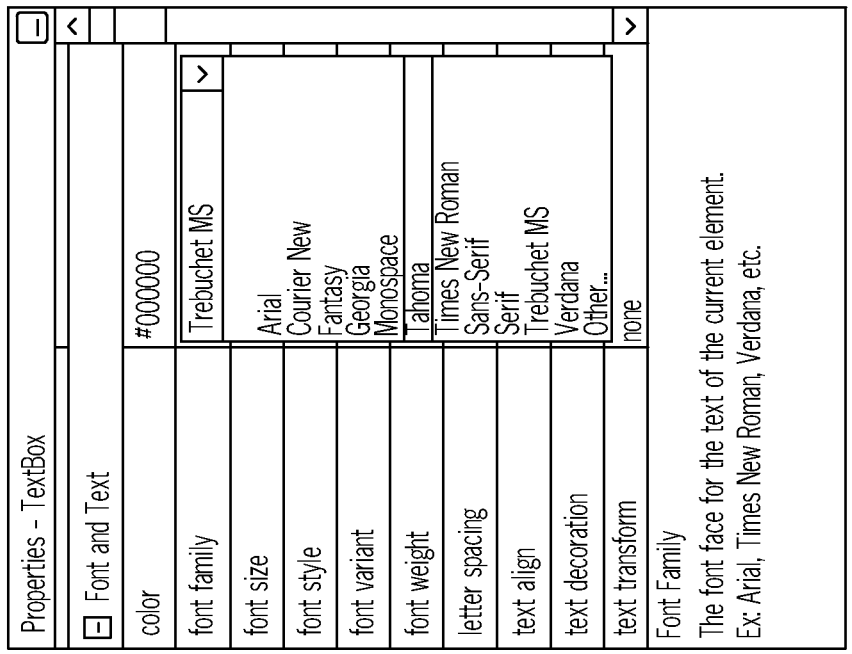
FIGS. 10A and B are screenshots of typical property input methods for the WYSIWYG designer tool according to an embodiment.
Figure 10A:
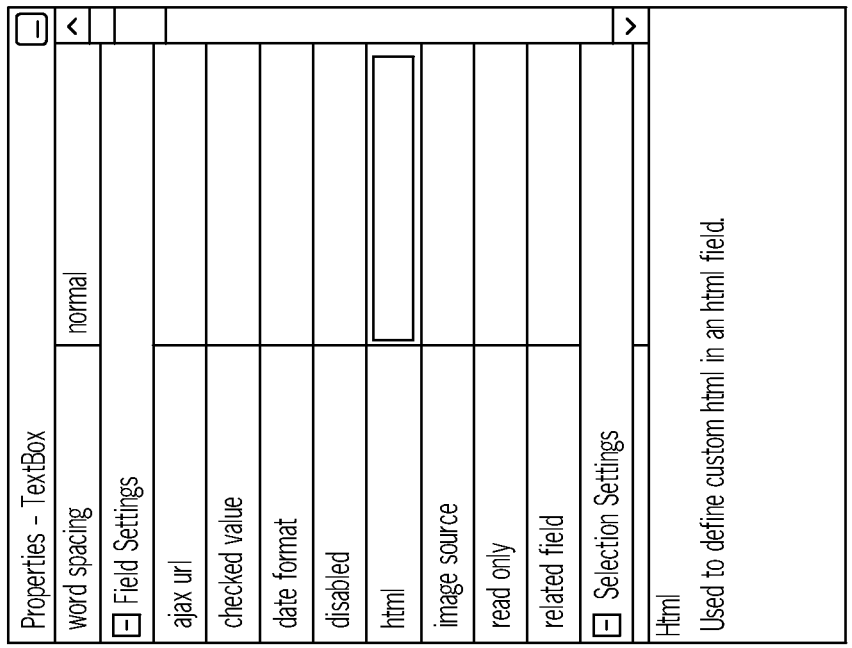

A property can be limited to a select list of values, such as, for example, a drop down menu as illustrated in FIG. 10A, or it can be entered in a free form manner, such as illustrated in FIG. 10B. Properties can accept simple values or script expressions that can run code to return the value, giving the developer the ability to add custom programming logic. In addition, some properties, such as, "onload", "onsubmit", "listing row onclick", "onblur", "onchange", "onclick", "ontabclick", "ondblclick", "onfocus", "onkeydown", "onkeypress", "onkeyup". "onmousedown", "onmousemove", "onmouseout", "onmouseover", "onmouseup", and similar, can represent events. Events can allow developers to execute code before or after something of significance happens, such as the user clicking on an element or the screen completely loading. This can allow for virtually unlimited flexibility in modifying and enhancing the application's capabilities. The programming language can be used to implement such events is a client-side script such as JavaScript. However, in addition, any server-side web-capable language such as Java, RPG, PHP, or ASP.NET can be utilized through the use of AJAX (Asynchronous JavaScript and XML) technology.

Another method of changing element properties/attributes or otherwise affecting the screen design may be through the use of context-sensitive menus. Preferably, these menus can be created using a scripting function that can manipulate the DOM. The developer can display these menus by right-clicking the screen elements, or by performing a similar mouse/keyboard operation.

Figure 11:
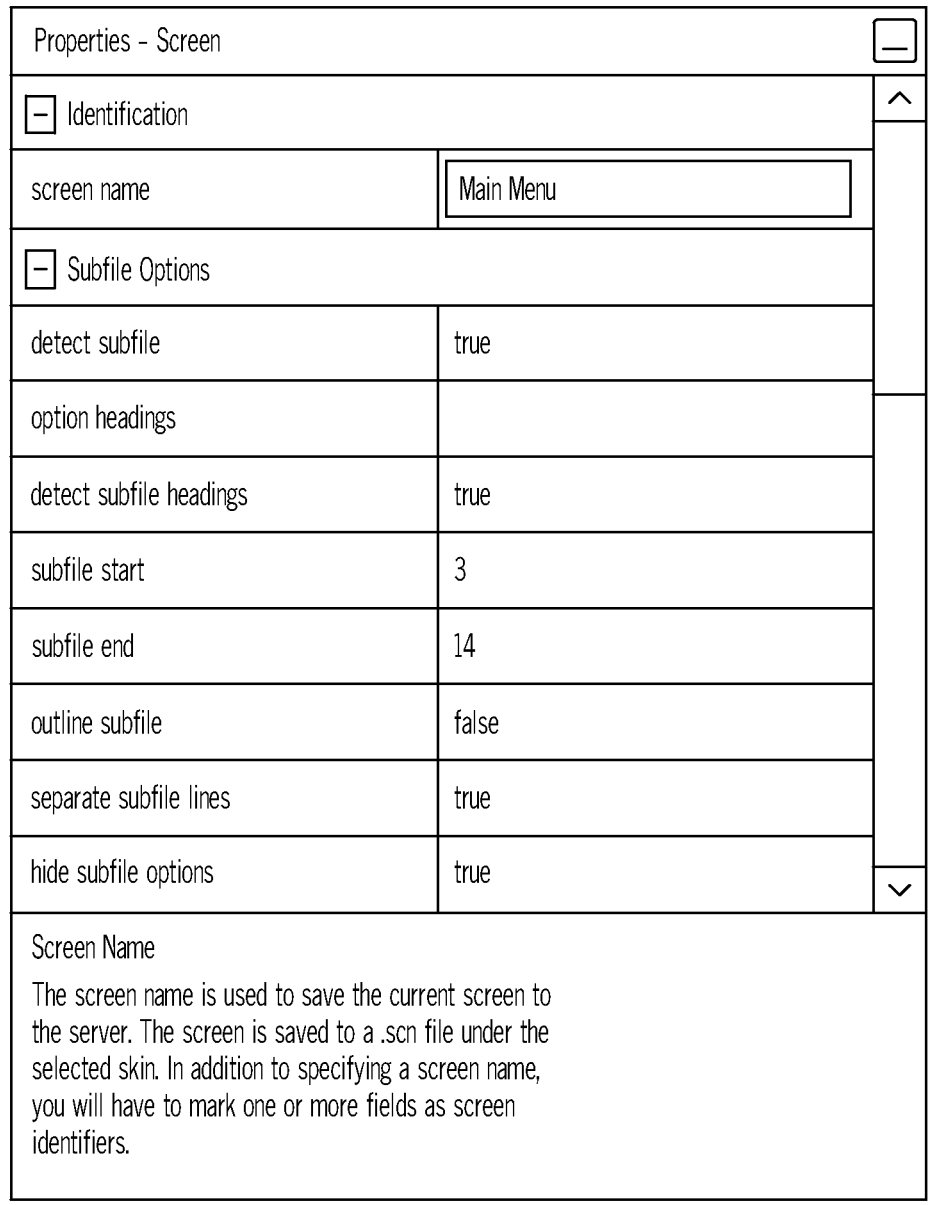
FIG. 11 is a screenshot of a screen definition inputs for the WYSIWYG designer tool according to an embodiment.

In addition to changing properties that relate to specific elements, the browser-based development tool may also allow the developer to change other types of properties, such as properties that can relate to the entire screen definition, as illustrated in FIG. 11. This can include, for example, a property to determine whether the headings are to be enlarged, a property that specifies the default font family, a property for the default date format, and the like.

Preferably all, or at least some, but not limited to the following attributes/properties are included:

Screen Name: The screen name is used to save the current screen to the server.

Detect Listings: This flag determines whether the application should look for a record listing on the current screen.

Outline Listing: If a listing is found, this flag determines whether an outline is drawn around the listing area.

Separate Listing Lines: If a listing is found, this flag determines whether a separator line is drawn between each line in the listing.

Row Highlight Color: Defines the color of the row when it is hovered over with the mouse. This can be altered by entering the color name, selecting the color, or specifying the hex value of the color.

Row Highlight Font Color: Defines the color of the text within the row when the row is hovered over with the mouse. This can be altered by entering the color name, selecting the color, or specifying the hex value of the color.

Striped Listing: This flag determines if the listing rows are striped with alternate colors.

Odd Row Color: Defines the color of the odd rows in a striped listing. This can be altered by entering the color name, selecting the color, or specifying the hex value of the color.

Even Row Color: Defines the color of the even rows in a striped listing. This can be altered by entering the color name, selecting the color, or specifying the hex value of the color.

Detect Date Fields: When set to true, the application looks for date fields on this screen and automatically attaches a calendar control to any field that it finds.

Default Date Format: Defines the default date format to be used in calendar controls.

Enlarge Headings: When set to true, the application looks for the screen heading and automatically increases its font size and adds a shadow.

Function Key Buttons: This flag determines whether legacy function key labels, such as 'F3=Exit', are transformed into buttons.

Hide Function Key Names: This flag looks for legacy function key labels and removes the function key name. For example, 'F3=Exit' becomes 'Exit'. The user will be able to click on the field to send the appropriate function key to the server.

Prevent Auto Tab: If set to false, the application will override the browser's default behavior of the Tab key with its own automatic tabbing. If set to true, the browser's default behavior is used for tabbing. The default value is false.

Set Field Background Color: If set to true, the application will set the background color of all fields to the match the main screen background color, preventing any underlying items from showing through. If set to false, all fields will be given a transparent background, allowing any underlying items to show through. The default value is false.

Use Fixed Font: If set to true, the application will set the font for this screen to Monospace. If set to false, the application will use the font specified in the style sheet.

Onload: Initiates a client-side script when the screen loads.

Onsubmit: Initiates a client-side script or expression before a response is submitted to the screen. This typically occurs when a function key is pressed or a button/hyperlink is clicked. If the expression evaluates to false, the response is not submitted.

Listing Row Onclick: Initiates a client-side script when a listing row is clicked.

Figure 12:
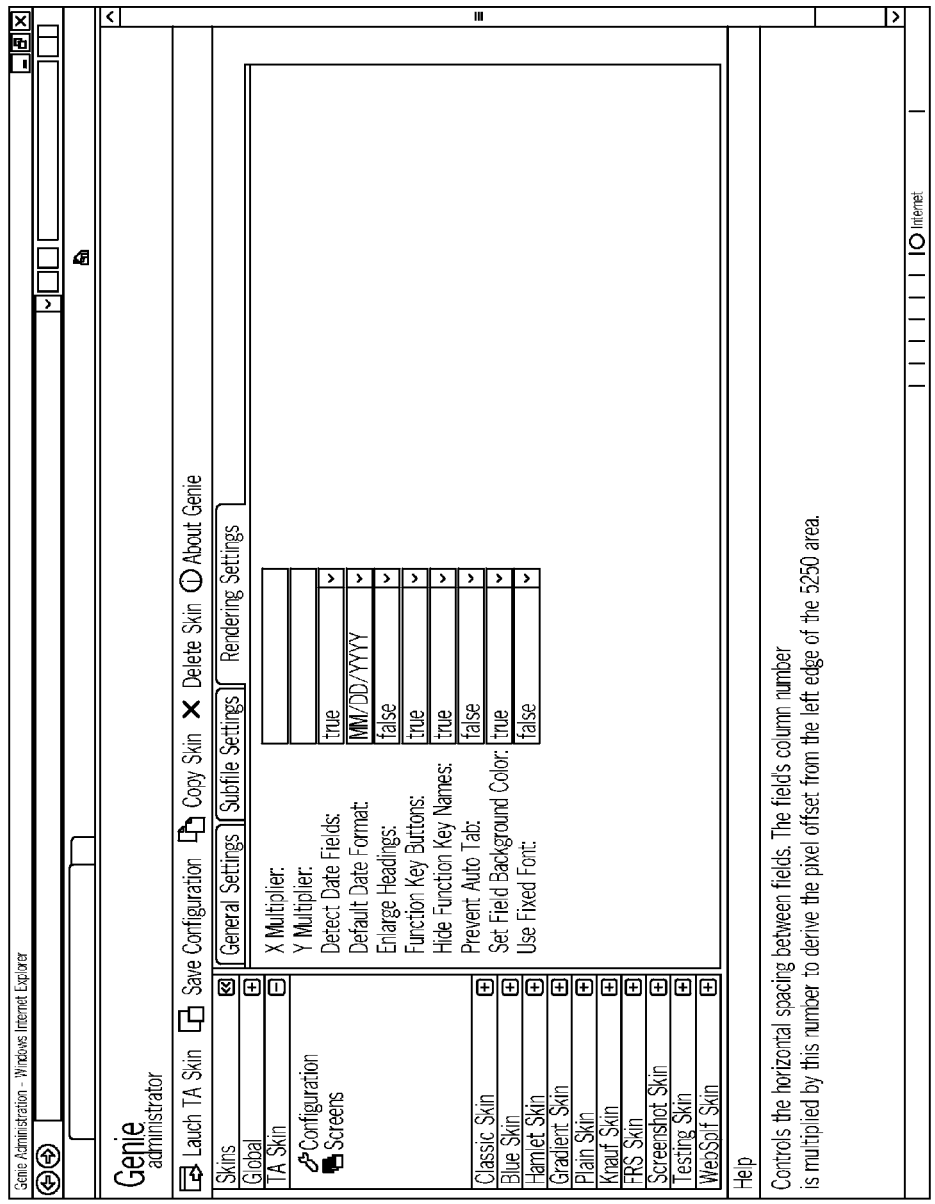
FIG. 12 is a screenshot of an administrator interface for the WYSIWYG designer tool according to an embodiment.

In addition, global options that apply to all screens, such as rendering options, can be maintained in a separate administrator interface as illustrated in FIG. 12. The administrator interface may also serve as a tool to manage screens, where the developer can delete, copy, promote, or perform other operations to screen definitions.

In addition to allowing the developer to change existing elements, the browser-based development tool can allow the developer to add a variety of new elements that can be displayed in a browser page. In one embodiment, the elements can be presented to the user as a drop down menu. The menu itself can be created using a script function that manipulates the DOM. The elements on the menu can represent simple HTML constructs or more complex rich components. Preferably, all, or some, but not limited to the following elements could be presented as options on the menu:

AJAX Containers—The AJAX container brings in content from other Web applications. It integrates with RPGsp, Java, PHP, .NET, and other Web technologies. The content is typically dynamic and can accept information from the screen as parameters. The application developer can place the container anywhere on the screen, size it in any way, and specify properties to control borders, backgrounds, vertical and horizontal scrolling, etc.

Buttons—The application developer can turn existing screen elements into buttons or add new buttons for new functionality. Buttons can initiate function keys, bring up pop-up dialogs, or execute code (client-side or server-side).

Charts—An application developer can pick a chart type and point at the database table needed for chart data. Additionally, the developer can generate chart data on the fly, with any Web capable language. Several types of charts that can be added includes bar graphs, line graphs, and/or pie charts.

Checkboxes—Any existing application field can be turned into a checkbox or new checkboxes can be added to the screen. Simply specify which values represent a checked state.

Date fields with pop-up calendars—Adding a pop-up calendar to any field is simple and requires no coding. This supports many different date formats.

Field Set Panels—This element provides a way to organize screen information into panels.

Figures 13, 14:
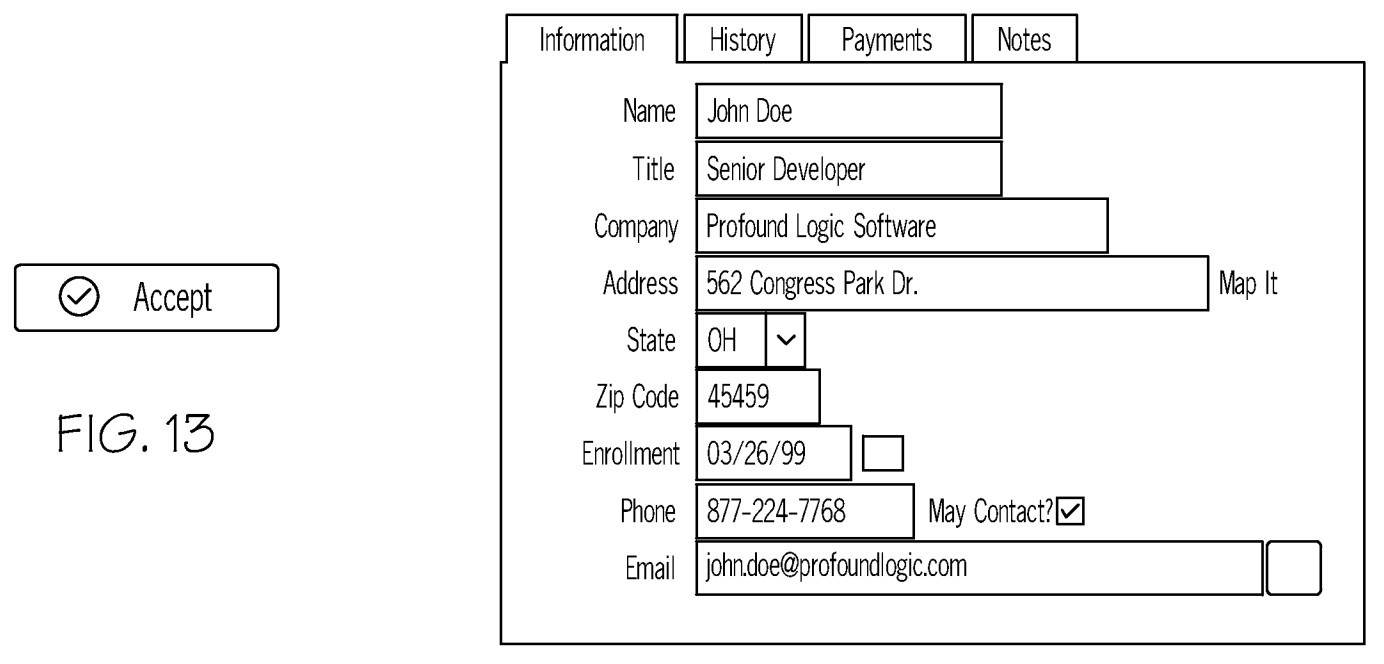

Graphic Buttons—Graphic buttons act just like regular buttons, but allow the combination of icons and/or text to be placed within the button as shown in FIG. 13.

HTML Containers—The HTML container allows developers to create their own custom elements using HTML code. The HTML code can be static or dynamic. Dynamic HTML can utilize values from other fields on the screen.

Hyperlinks—Hyperlinks can link to other applications, initiate function keys, submit menu options, bring up dialogs, or execute code.

Images—Image files stored on a Web server can be displayed using this element. Application developers can display dynamic images just as easily as static ones. For example, a developer can display a product image based on a product number in an inquiry application.

List Boxes—A list box allows a user to select one or more items from a list. In an application, the list can be a static list of items or a dynamic list loaded from a database table using an SQL expression or similar query language.

Output Fields—An output field displays application text on the screen. Each of the output fields can be styled in a variety of different ways.

Password Fields—Password fields are textboxes that mask the characters that are typed into them.

Radio Buttons—Users can turn existing application elements into radio button groups, so that they can pick from several different choices. All that is required to perform this is arrange the radio buttons on the screen and relate them together.

Select Boxes—The select box allows the user to pick a value from a drop-down list of items. A user can provide the items as a static list or as a database-driven dynamic list.

Tab Panels—Tab panels provide a way to organize information on a cluttered screen. Everything is done in a point-and-click manner. Users simply need to pick some tab names, and then drag and drop the elements onto the various tabs created. An example of a tab panel is shown in FIG. 14.

Text Areas—A text area is a multi-line input control. Multiple textboxes on a screen can also be combined into one multi-line field.

Textboxes—The textbox element is a standard input box that accepts free-form text entry or text entry based on auto-complete suggested values from a database or custom list.

The elements can be added to the screen design by manipulating the document's DOM and updating the appropriate constructs in the designer, such as a JavaScript object that keeps track of all the elements on the screen and its properties.

Using the browser-based development tool system can have some inherent advantages over prior methods of developing browser applications. These benefits include: an accurate WYSIWYG view, integrated development and almost effortless deployment and management. The designer tool can produce a completely accurate WYSIWYG view of all application screens. Unlike convenient desktop-based application development tools, the browser-based designer can run within the same browser window as the final output producing accurate results. All tasks can be integrated into one browser session, making it easy to prototype, develop, test, and deploy. Application deployment and management can be strictly server-based. Thereby, no desktop tools will need to be maintained. All user interface updates can be made in one central place on the server. Developers and end-user only need a browser, such as Internet Explorer, Firefox, Netscape, Opera, and Safari.

Figure 15B:
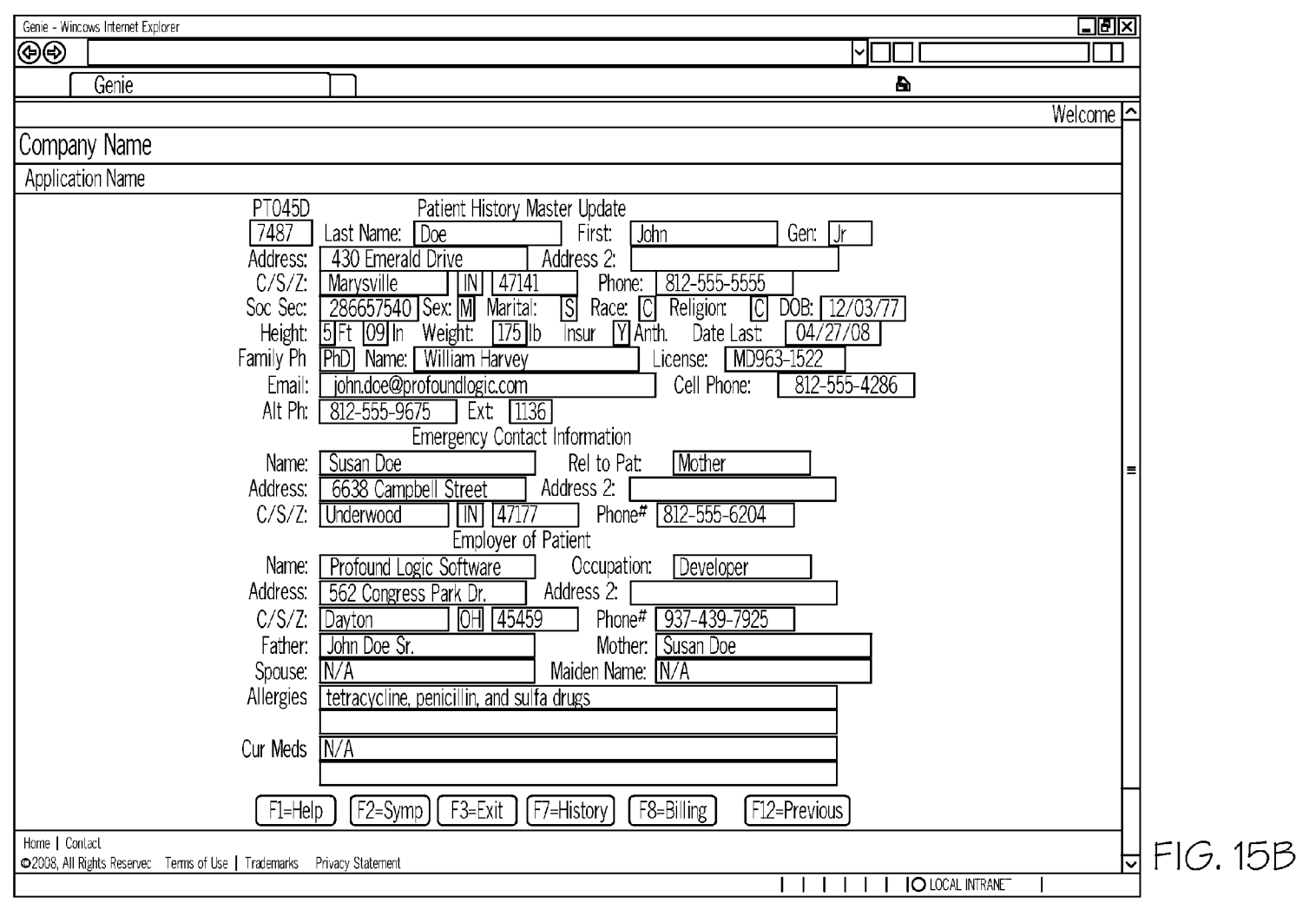
Figure 15C:
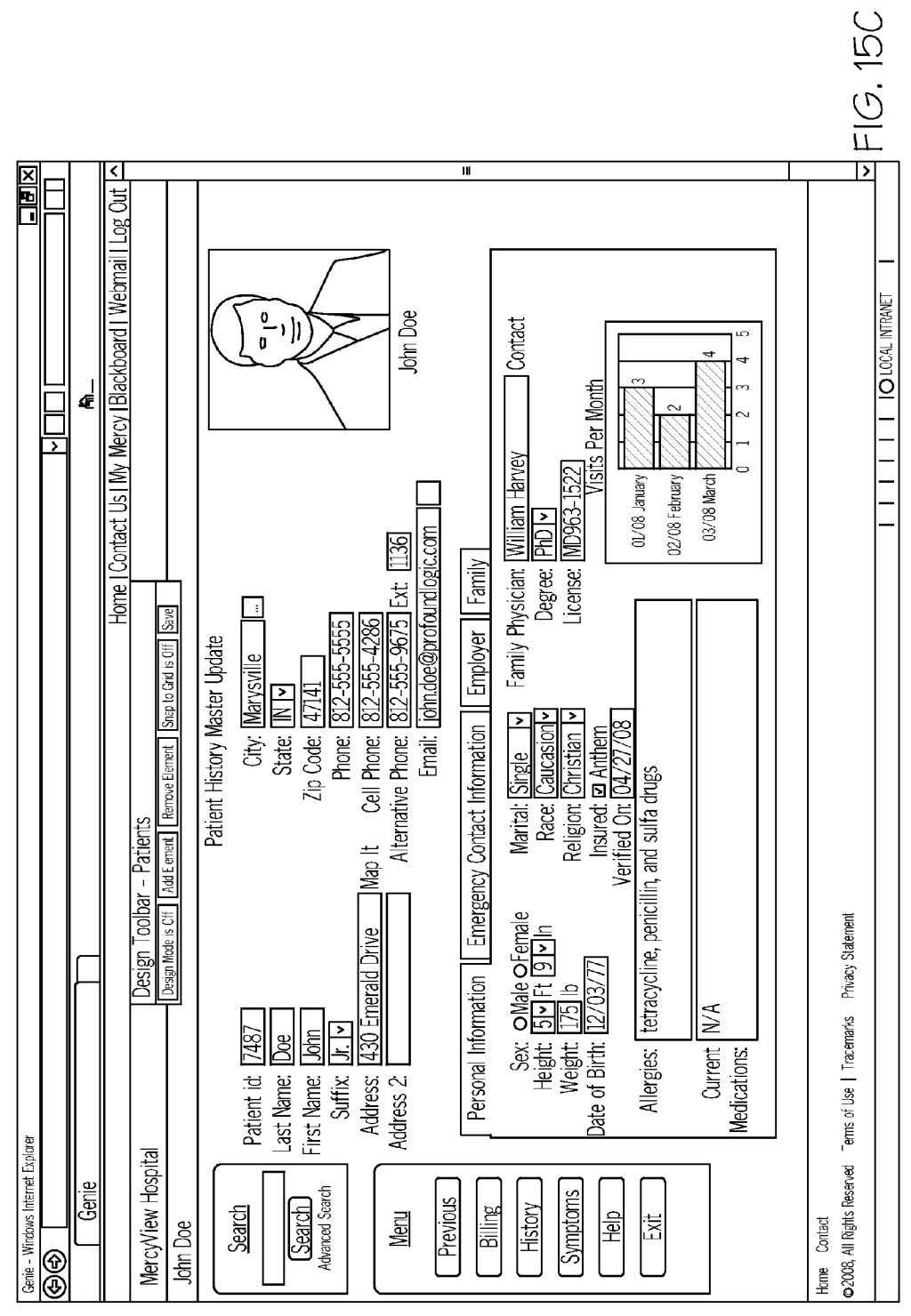

One possible application of the above technology can be in the area of legacy software modernization. Legacy software that has been modernized to a browser-based interface can be further enhanced with an application development tool that itself can run in a browser. FIG. 15A shows a screen from a character-based application. After being modernized to run in a browser, the screen may look as illustrated in FIG. 15B. When further enhanced with an application development system that can reside in a browser as described by this disclosure, the screen can look and function as illustrated in FIG. 15C.

The developer can find the screens by navigating the application in the browser and then enabling design mode, opening the screens by name, or using another similar method to load the screen into the browser page.

The developer can also use the browser-based development tool system to build new application screens.

It is noted that terms like "preferably," "commonly," and "typically" are not utilized herein to limit the scope of the claimed disclosure or to imply that certain features are critical, essential, or even important to the structure or function of the claimed disclosure. Rather, these terms are merely intended to highlight alternative or additional features that may or may not be utilized in a particular embodiment of the present disclosure.

Having described the disclosure in detail and by reference to specific embodiments thereof, it will be apparent that modifications and variations are possible without departing from the scope of the disclosure defined in the appended claims. More specifically, although some aspects of the present disclosure are identified herein as preferred or particularly advantageous, it is contemplated that the present disclosure is not necessarily limited to these preferred aspects of the disclosure.

What is claimed is:

1. A method for developing and deploying a browser-based application over an application, development, and deployment network comprising a client, a server, a client/server network connection, additional clients, and additional client/server network connections, wherein the client and the server communicate with each other over the client/server network connection, the additional clients and the server communicate with each other over the additional client/server network connections, and the method comprises:

running a browser-based development tool on the client;
using the browser-based development tool to develop the browser-based application with an interactive user interface on the client;
displaying the browser-based application in a browser field on the client;
selecting a data source on the server over the client/server network connection connecting the client and the server;
using the browser-based development tool to retrieve a limited data set from the data source on the server over the client/server network connection;
populating a plurality of individual cells in the interactive user interface on the client with data from the limited data set on the client retrieved from the data source on the server;
saving the browser-based application on the server over the client/server network connection; and
deploying the browser-based application to additional clients from the server over the additional client/server network connections.

2. The method of claim 1, further comprising:

sending a request to the server to retrieve additional data from the data source in response to a user scrolling through the interactive user interface on the client to view the additional data;
updating the data in the limited data set on the server with the additional data and repopulating the plurality of individual cells with the limited data set as the interactive user interface on the client is scrolled;
detecting a period of inactivity by the user on the client and stopping the request to the server for the additional data from the data source;
caching previously viewed data from the limited data set on the client; and
updating the data source on the server when the user makes changes to the data in the limited data set on the client.

3. The method of claim 2, further comprising:

aborting the request to the server for the additional data from the data source when the user chooses a superseding request to the server.

4. The method of claim 1, wherein the data source comprises a database, a listing, a grid, a data entry form, a record inquiry, a dynamic graph, a dynamic chart, or a combination thereof.

5. The method of claim 1, wherein a multiple of database tables are selected simultaneously, a plurality of limited data sets corresponding to the multiple of database tables are displayed in the interactive user interface, the multiple of database tables are updated independently from each other whenever a user makes changes to the plurality of limited data sets, and the multiple of database tables are able to be closed independently from each other.

6. The method of claim 5, wherein the plurality of data sources are represented by tabs in the browser field on the client.

7. The method of claim 1, wherein the browser-based development tool develops the browser-based application by defining, creating, editing, using, updating, modifying, or combinations thereof.

8. The method of claim 1, further comprising:

debugging the browser-based application on the client before saving the browser-based application on the server.

9. The method of claim 1, wherein the browser-based application is legacy software.

* * * * *